United States Patent
Herber

(10) Patent No.: US 11,902,406 B2
(45) Date of Patent: Feb. 13, 2024

(54) DATA COMMUNICATION USING CONSTRAINED APPLICATION PROTOCOL OVER LOCAL AREA NETWORK

(71) Applicant: NXP B.V., Eindhoven (NL)

(72) Inventor: Christian Herber, Hamburg (DE)

(73) Assignee: NXP B.V., Eindhoven (NL)

( * ) Notice: Subject to any disclaimer, the term of this patent is extended or adjusted under 35 U.S.C. 154(b) by 88 days.

(21) Appl. No.: 17/573,822

(22) Filed: Jan. 12, 2022

(65) Prior Publication Data

US 2023/0224384 A1 Jul. 13, 2023

(51) Int. Cl.
| | | |
|---|---|---|
| *H04L 69/10* | (2022.01) | |
| *H04L 69/22* | (2022.01) | |
| *H04L 69/321* | (2022.01) | |
| *H04L 69/324* | (2022.01) | |
| *H04L 69/168* | (2022.01) | |
| *H04L 69/14* | (2022.01) | |
| *H04L 69/329* | (2022.01) | |

(52) U.S. Cl.
CPC ............ *H04L 69/321* (2013.01); *H04L 69/10* (2013.01); *H04L 69/14* (2013.01); *H04L 69/168* (2013.01); *H04L 69/324* (2013.01); *H04L 69/329* (2013.01)

(58) Field of Classification Search
None
See application file for complete search history.

(56) References Cited

U.S. PATENT DOCUMENTS

| | | | | |
|---|---|---|---|---|
| 10,841,130 | B2 * | 11/2020 | Becker | H04L 12/4625 |
| 2014/0359133 | A1 * | 12/2014 | Tian | H04L 47/72 709/226 |
| 2014/0376521 | A1 * | 12/2014 | Wang | H04L 1/1607 370/336 |
| 2017/0279775 | A1 * | 9/2017 | Savolainen | H04L 63/0281 |
| 2017/0325125 | A1 * | 11/2017 | Novo Diaz | H04W 28/06 |
| 2019/0075073 | A1 * | 3/2019 | Erickson | H04W 40/24 |
| 2019/0222984 | A1 * | 7/2019 | Prabhudeva | H04W 4/44 |
| 2021/0326331 | A1 * | 10/2021 | Shin | H04W 4/50 |
| 2022/0330204 | A1 * | 10/2022 | Shah | H04L 41/145 |

OTHER PUBLICATIONS

"IEEE Standard for Ethernet," in IEEE Std 802.3-2018 (Revision of IEEE Std 802.3-2015), vol. No., Redacted from pp. 1-5600, Aug. 31, 2018, doi: 10.1109/IEEESTD.2018.8457469, pp. 118-123; 6 pages.
Bormann, "Block-Wise Transfers in the Constrained Application Protocol (CoAP)," Internet Engineering Task Force, Standards Track, Aug. 2016; 3 pages.
Bormann, "Constrained Application Protocol (CoAP) over IEEE 802.15.4 Information Element for IETF," Internet Engineering Task Force, Standards Track, Apr. 3, 2016; 1 page.

(Continued)

*Primary Examiner* — Duc T Duong

(57) ABSTRACT

A system for data communication between electronic devices comprises a first electronic device that is a resource-constrained device; and a second electronic device that exchanges data with the first electronic device. One of the first electronic device and the second electronic device generates a message in a data unit frame complying with a protocol stack that includes a Constrained Application Protocol (CoAP) message on a data link layer in the absence of a User Datagram Protocol (UDP) layer.

19 Claims, 5 Drawing Sheets

(56) References Cited

OTHER PUBLICATIONS

IEEE LAN/MAN Standards Committee, "IEEE Standard for Local and metropolitan area networks, Media Access Control (MAC) Security," IEEE-SA Standards Board, Sep. 27, 2018; 239 pages.
IEEE LAN/MAN Standards Committee, "Information technology—Telecommunications and information exchange between systems—Local and metropolitan area networks—Specific requirements—, Part 2: Logical Link Control," Int'l Std ISO/IEC 8802-2: 1998, ANSI/IEEE Std 802.2, 1998 edition; 255 pages.
Shelby et al., "The Constrained Application Protocol (CoAP)," Internet Engineering Task Force, Standards Track, Jun. 2014; 7 pages.

* cited by examiner

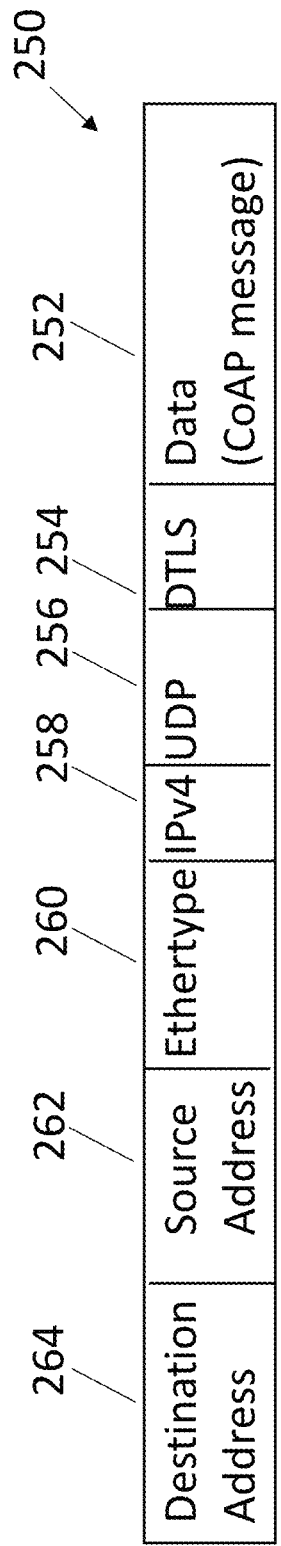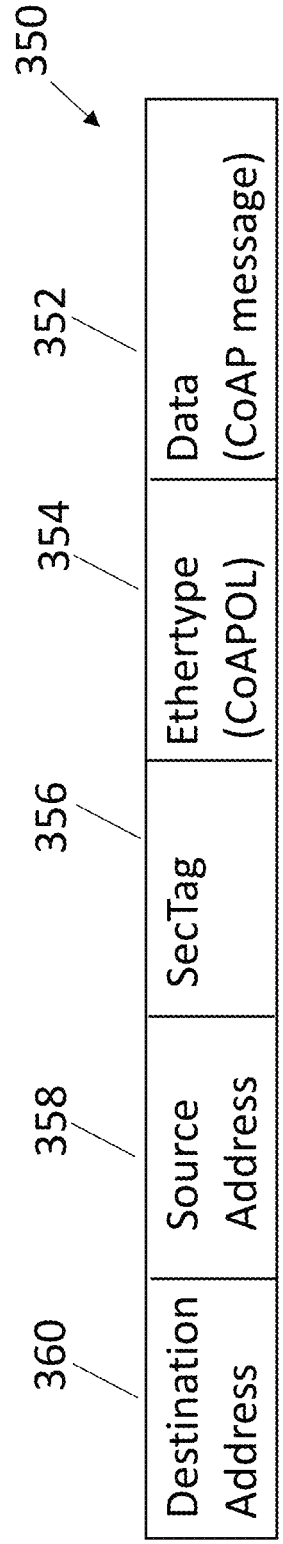

DATA COMMUNICATION USING CONSTRAINED APPLICATION PROTOCOL OVER LOCAL AREA NETWORK

FIELD

The present disclosure relates generally to data communications, and more specifically, to an application of the Constrained Application Protocol (CoAP) over a local area network (LAN).

BACKGROUND

The Constrained Application Protocol (CoAP) is an Internet protocol that may be defined by the Internet Engineering Task Force (IETF), which allows electronic devices to perform stateless data transfers over an IP network such that each communication request is processed according only to the data provided with the request. Conventional CoAP is particularly useful with permitting low-power devices are constrained in resources, e.g., compute, power, connectivity, etc.) but communicate with other devices on the Internet or mobile communication network. For example, conventional CoAP can be implemented as an Internet of Things (IoT) protocol for data transmissions in various industrial or automotive applications.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2B is a view of a data unit including a conventional CoAP protocol stack.

FIG. 3 is a view of a data unit including a CoAPOL protocol stack, in accordance with some embodiments of the present inventive concept.

DETAILED DESCRIPTION

Conventional CoAP configurations are constructed and arranged to run on devices that support the User Datagram Protocol (UDP) or Datagram Transport Layer Security (DTLS) as a transport protocol. However, for very low-end devices, the use of UDP or DTLS may be resource consuming.

In brief overview, provided are embodiments of a system and method that may permit CoAP to be constructed and arranged directly over a data link layer of an underlying local area network communication protocol such as Ethernet (IEEE 802.3), Wi-Fi (IEEE 802.11p), CAN-XL, and so on without requiring a secure Internet Protocol transport. Network devices complying with this format may be referred to as "CoAPOL" or CoAP over LAN devices. CoAPOL may be similar to CoAP in many respects, for example, message exchanges including CON, NON, ACK, and RST, but differs with respect to the lower levels such as the transport and network layers of the protocol stack. Although Ethernet is described by way of example, some embodiments of the present inventive concept can be applied to any data link that supports a protocol identification. In this manner, CoAP can be implemented in a Local Area Network (LAN) environment. For example, CoAP may be implemented directly on top of an Ethernet data link layer. Instead of operating at the network layer, i.e., Layer 3 of an Open Systems Interconnection (OSI) reference model, as with IPsec, security concerns may be addressed by a security protocol such as the MACsec or the like, which provides integrity and confidentiality by operating at Layer 2, e.g., Ethernet frames or the like.

Figure 1:
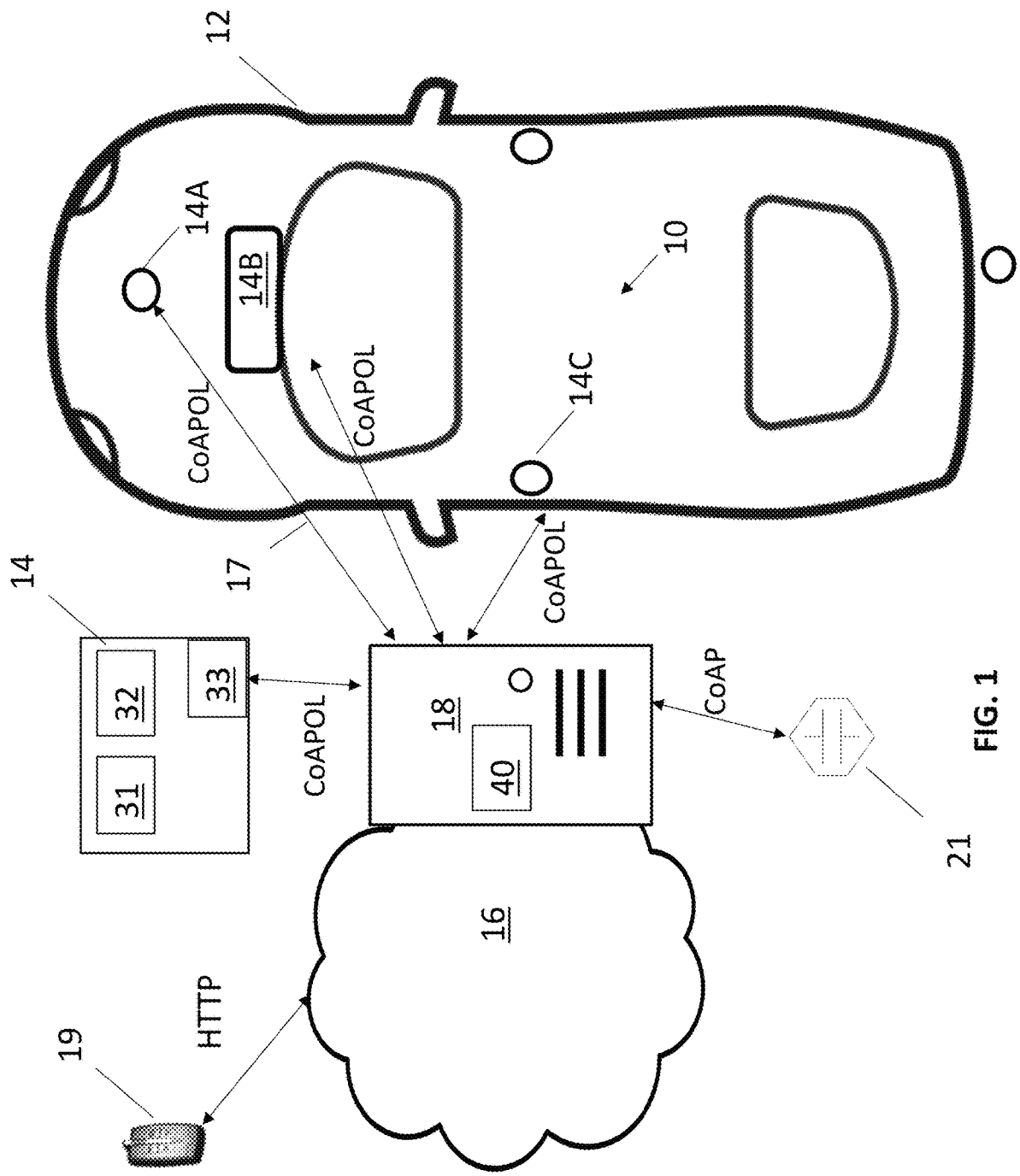
FIG. 1 illustrates a network environment in which embodiments of the present inventive concept may be practiced.

FIG. 1 illustrates a network environment in which embodiments of the present inventive concept may be practiced. The environment can include a constrained environment 10 and a public and/or private network 16 such as the Internet. A server 18 or related proxy computer or the like that stores and executes an application 40 that facilitates an exchange of data between a plurality of resource-constrained devices such as Internet-of-Things (IoT) devices 14A, electronic displays 14B, sensors 14C, and/or other electronic devices (collectively referred to as constrained network devices 14, or CoAPOL devices) of an automobile 12, and client devices 19 such as smartphones, personal computers, cloud computing devices, and so on that are connected to the network 16. Constrained devices can be clients or servers. As shown in FIG. 1, a constrained network device 14 can include a processor 31, a memory 32, and an I/O device 33, each of which can include well-known physical and functional features. A CoAP protocol stack described herein can be stored at the memory 32, executed by the processor 31, and output from the I/O device 33. In addition to or alternative to the Internet, the network 16 may include an HTTP network, mobile communication network, public switched telephone network (PSTN), cloud computing network, local area network (LAN), private network, or a combination thereof. The automobile 12 may include a network configuration that supports SDN or the like as a protocol. The automobile 12 may include a management interface (not shown) such as CORECONF or the like, but not limited thereto, which can communicate with the CoAP devices 14, the server 18, and/or other CoAP-compliant computing devices. Although an automobile 12 is illustrated by way of example, the constrained environment is not limited thereto and may apply to other applications. In some embodiments, the server 18 includes a CoAPOL-to-CoAP proxy system that exchanges data between the CoAPOL devices 14 of the constrained environment 10, for example, in an automobile, and traditional CoAP devices via a communication path 17, e.g., a wireless path. For example, the CoAPOL devices 14 may be configured to store and execute a CoAPOL protocol stack and corresponding data unit 350 shown and described in FIG. 3, and the traditional CoAP device 21 such as a CoAP node or the like may be configured to store and execute a CoAP protocol stack 200 and corresponding data unit 250 shown in FIGS. 2A and 2B, respectively. In some embodiments, a separate proxy node (not shown) in communication with the server 18 may operate as a CoAP logical entity that is located between a client, e.g., constrained devices 14, and the CoAP server 18, and provide a routing path to process CoAP protocol messages, for forwarding, filtering, permission checking, target address query, and so on.

As described herein, embodiments of the present inventive concepts include a combination of LAN technology (e.g., IEEE 802.3 Ethernet) and CoAP without the need for Layer 3 (IP) and/or Layer 4 (UDP) protocols. In doing so, the CoAP server 18 can be addressed with a MAC address instead of an IP-address and port number. The identification of COAP payloads based on Ethertype providing optional security can be achieved through MACsec or the like, including multicast.

A system including some or all elements of the network environment of FIG. 1 permits CoAP to be implemented on nodes 14 that have Ethernet connectors but no DTLS/UDP/IP capability, such as small microcontrollers, ECUs executing Ethernet over CAN-XL, and so on.

Figure 2A:
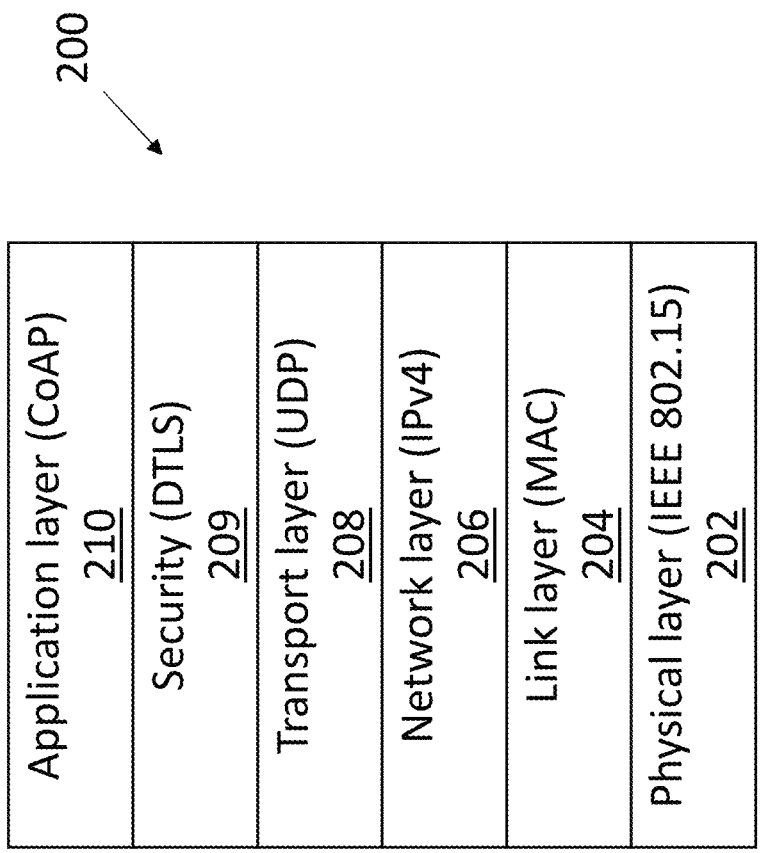
FIG. 2A depicts a protocol stack for a wireless network including examples of the communication protocols at each layer of the protocol stack.

FIG. 2A depicts a protocol stack 200 in compliance with the Open Systems Interconnection model (OSI model) with some examples of the communication protocols at each layer. The network stack 200 may be implemented in a wireless network, for example, part of an IoT and/or M2M configuration.

The protocol stack 200 may include a physical layer 202, a link layer 204, a network layer 206, a transport layer 208, and an application layer 210. Features of the physical layer 202, link layer 204, and network layer 206 are well-known and are therefore not described in detail for brevity. The network layer 206 may include the IPv4 or IPv6 protocol but is not limited thereto for controlling the messaging at the network layer 206. The physical layer 202 and link layer 204 may comply with standards-based protocols related to IEEE 802.15, Ethernet, Bluetooth, LPWAN, and so on.

The application layer 210 may include CoAP that is positioned on the transport layer 208, which may include UDP, and implemented in resource-constrained nodes. In contrast to the complexity of HTTP, CoAP can operate as a web-transfer protocol, which is simply translated to HTTP and simplifies the integration with the Web. Since CoAP is designed over UDP, Datagram Transport Layer Security (DTLS) 209 is available to provide security-related services as TLS.

FIGS. 2B and 3 illustrate a comparison between a data unit of a conventional CoAP data unit 250 and a CoAP data unit 350 according to some embodiments of the present inventive concept. The data units 250, 350 may be part of a data message or the like. In some embodiments, the CoAP data unit 350 in FIG. 3 may be formed for transmission as part of the constrained network 10 of FIG. 1, and in particular may be stored and executed by the various devices 14 of the constrained network 10 and the server 18 of FIG. 1.

The conventional CoAP data unit 250 illustrated in FIG. 2B may include a CoAP message 252, a DTLS header 254, a UDP header 256, an IPv4 header 258, an Ethertype field 260, a Source Address field 262, and a Destination Address field 264.

The CoAP message 252 can have a predetermined maximum message size, for example, 1152 Bytes but not limited thereto. The CoAP message 252 can be secured using the DTLS header 254 over UDP 256.

Conventional CoAP is constructed and arranged for the TCP/IP Protocol suite. Accordingly, the Ethertype field 260 includes a version of IP, for example, IPv4 or IPv6.

For use-cases in automotive and industrial applications, the use of DTLS may be excessively resource consuming. In addition, conventional CoAP implementations including DTLS cannot support multi-cast capabilities. To address the foregoing, provided in some embodiments is a protocol stack in which the application layer including CoAP is directly on top of an Ethernet data link layer. This arrangement may not comply with the IETF due at least in part to the absence of UDP or IP transport layer. In this manner, CoAP can be used within a Local Area Network (LAN) without requiring secure Internet Protocol transport. Security concerns may be addressed through the use of MACsec. This inventive concept is not limited to Ethernet, but can be applied to any to any data link that supports protocol identification, for example, for example, through the use of an Ethernet Type (or "Ethertype"), for example, in compliance with IEEE 802.11 technical standards, such as Subnetwork Access Protocol (SNAP).

As shown in FIG. 3, a CoAP data unit 350 according to some embodiments may include a CoAP message 352, Ethertype field 354, Security Tag (SecTag) field 356, a Source Address field 358, and a Destination Address field 360. In some embodiments, the data unit 350 can include or be part of an Ethernet frame or the like, but not limited thereto.

The CoAP message 352 can have a predetermined maximum message size of 1500 Bytes but not limited thereto. In some embodiments, the CoAP message 352 may be the same as the CoAP message 252 shown in FIG. 2B. However, unlike the conventional CoAP message 252 shown in FIG. 2B, the CoAP message 352 here can be directly on top of an Ethernet data link layer, and the Ethertype for CoAPOL can be between SecTag and the CoAP message. Therefore, CoAP can be used within a Local Area Network (LAN) without requiring secure Internet Protocol transport. In addition, this configuration (CoAP over Ethernet data link medium) permits the larger CoAP message size (1500 B), or up to 9000 B with jumbo Ethernet frames. In this manner, the use of block-wise transfers is less likely, resulting in a faster completion of requests. Network devices executing the CoAP message 252 of FIG. 2B may perform undesirable block-wise transfers. Devices executing the CoAP message 352 of FIG. 3, on the other hand, may perform IP fragmentation operations, not block-wise transfers. This feature may also permit Software-Defined Networking to be implemented, which may use CoAP is the transport protocol.

The Ethertype field 354 is constructed and arranged to indicate CoAP over local area network (LAN) (CoAPOL) as the protocol encapsulated in the payload 354 of the frame and used at the receiving end by the data link layer to determine how the payload is processed. The EtherType can be a two-octet field in an Ethernet frame, but not limited thereto. The CoAPOL EtherType may correspond to a proprietary LAN, but not limited thereto.

The Security Tag (SecTag) field 356 is constructed and arranged to indicate MACsec, e.g., 802.1AE MACsec standard or the like to provide security in lieu of a resource-consuming security offered by DTLS. The Source Address field 358 and Destination Address field 360 can identify a MAC source and destination address, respectively. Additional details are not described due to brevity because the Source Address field 358 and Destination Address field 360 are well-known elements of data units such as Ethernet frames.

The CoAPOL-compliant format supports multi-cast because DTLS is not part of the format. In particular, the use of MACsec or related Layer 2 Ethernet security, secure CoAP multicast can be achieved.

Another feature is that CoAPOL, when operating on Layer 2 Ethernet or the like and used to configure IP, requires an IP connection to be established. Therefore, CoAP-based SDN protocols can be used to set up the IP configuration prior to the IP connections being established.

It is well-known that CoAP is used to configure network devices remotely. Conventional CoAP implementation techniques require the IP address of the remote network device to be known in advance before executing the network protocols, i.e., CORECONF, in which CoAP is used. However, CoAPOL does not require an IP address in this manner.

Figure 4:
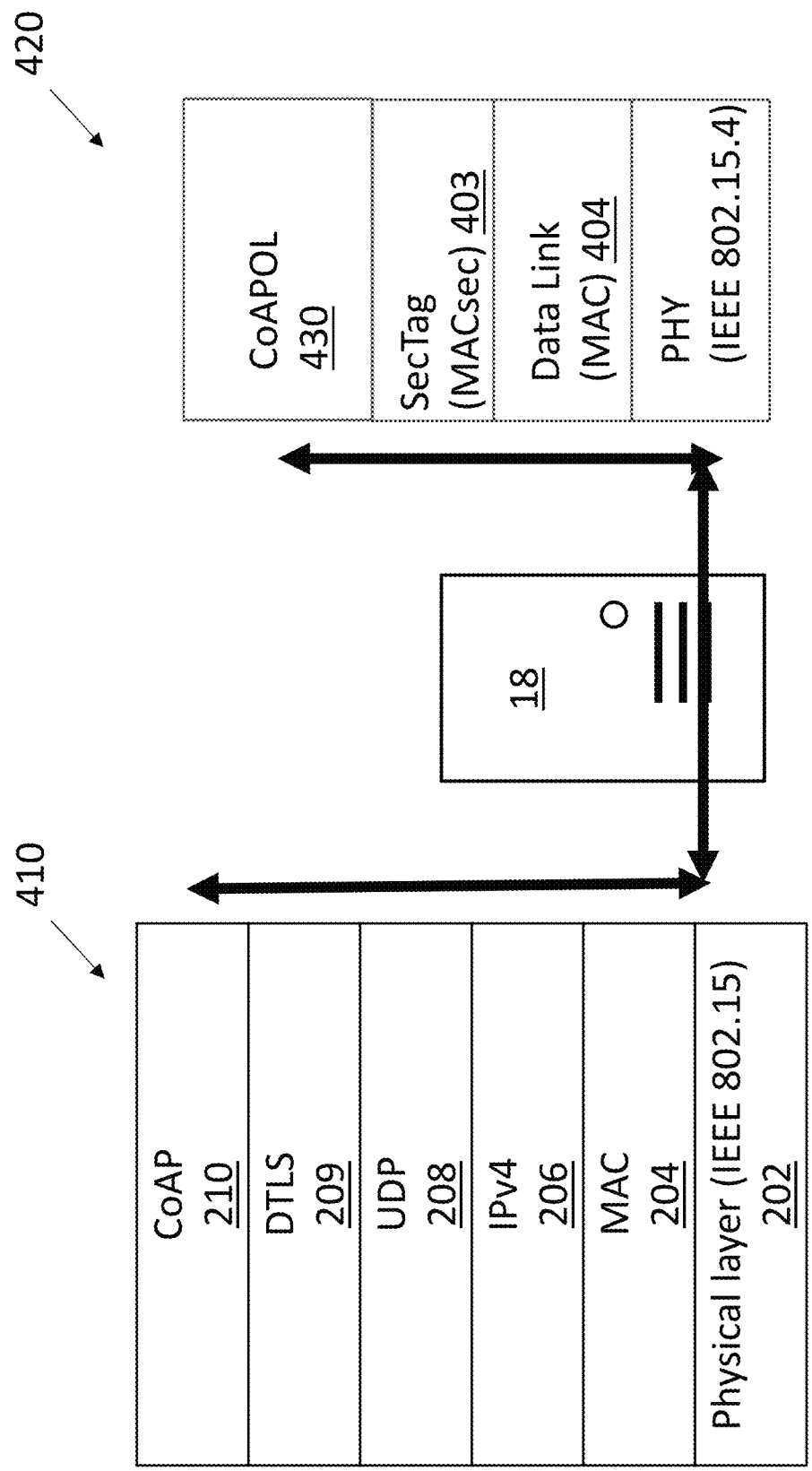
FIG. 4 illustrates a data exchange in a CoAP environment, according to some embodiments of the present inventive concept.

FIG. 4 illustrates a data exchange in a CoAP environment, according to some embodiments of the present inventive concept. In particular, the proxy computer 18 illustrated in FIG. 1 facilitates a data change between an electronic device that stores and processes data corresponding to a CoAPOL protocol stack 420 and an electronic device that stores and processes data corresponding to a conventional CoAP protocol stack 410, e.g., in compliance with RFC 7252, and stored and processed by a conventional CoAP device, such as node 21. The electronic device storing the CoAPOL protocol stack 420 may be a CoAPOL device such as constrained devices 14 shown in FIG. 1 or a computer server or the like that facilitates communications with multiple CoAPOL devices. The conventional CoAP protocol stack 410 may be the same or similar to the CoAP protocol stack 200 of FIG. 2A. A device configured to communicate using the CoAPOL protocol stack 420 may lose the ability to perform logical addressing, and therefore may be unable to communicate with a device configured to communicate using the CoAP protocol stack 410. The proxy computer 18 permits the two disparate devices to perform a data communication exchange between them.

In some embodiments, the proxy computer 18 may perform translations between the application protocols CoAP application layer 210 of the conventional CoAP protocol stack 410 and the CoAP layer 210 of the conventional CoAP protocol stack 410 and the CoAPOL layer 430 of the CoAPOL protocol stack 420. In other embodiments, the CoAP message is the same, except that the Ethertype for CoAPOL is between the SecTag and the CoAP message. Here, the CoAPOL layer 430 can include the Ethertype in addition to the CoAP. Therefore, the CoAP layer 430 includes the payload as well as the header, i.e., the entire message.

The proxy computer 18 may store and executes specific translation rules concerning a MAC/UDP/CoAP frame (FIG. 2A-2B) translation and/or mapping to and from a MAC/CoAPOL frame (FIG. 3).

Figure 5:
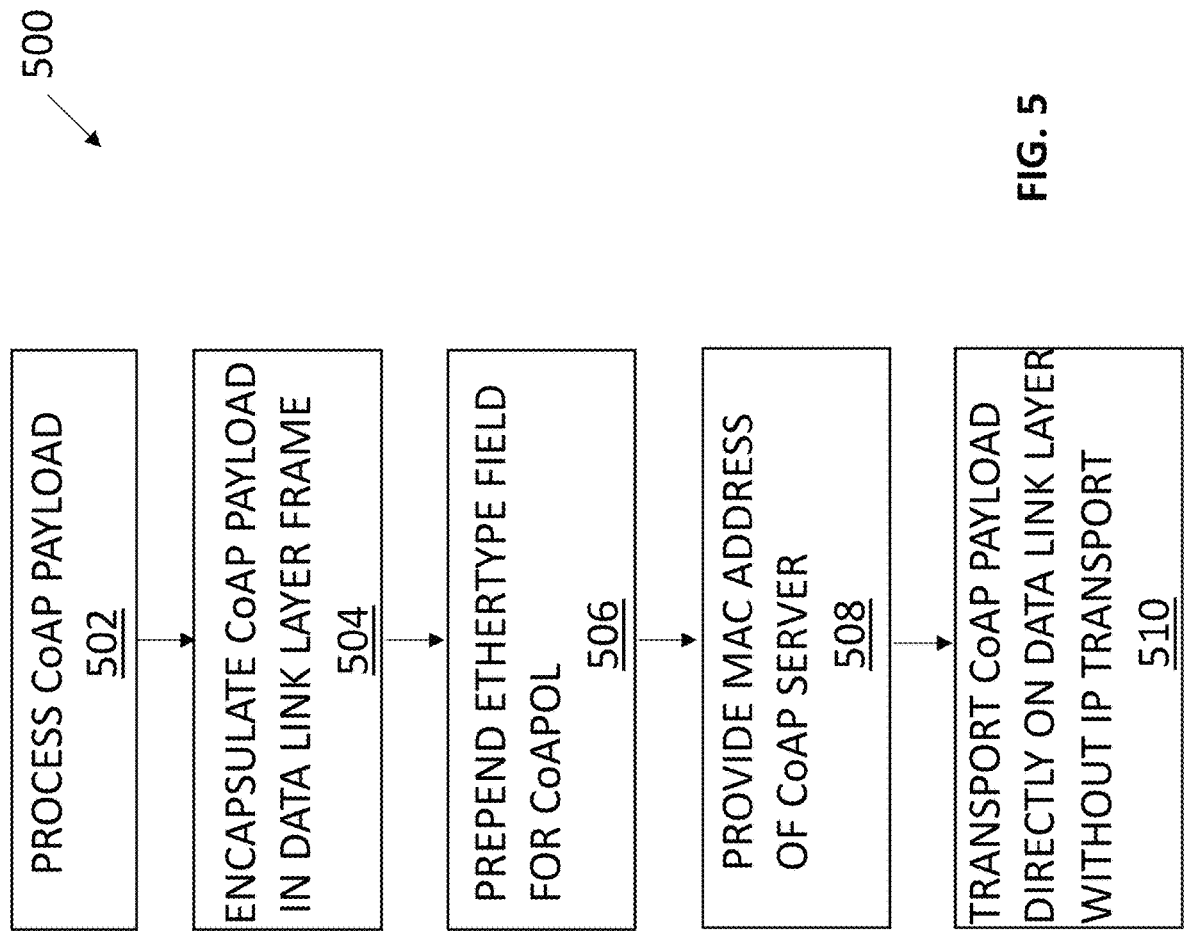
FIG. 5 is a flowchart of a method for data communication, in accordance with some embodiments.

FIG. 5 is a flowchart of a method 500 for data communication, in accordance with some embodiments. In describing the method 500, reference may be made by way of example to elements of the network environment of FIG. 1.

At block 502, a CoAP payload may be processed. By way of example, a CoAP payload may be included in the CoAPOL layer 430. A payload can be received from small devices such as sensors and actuators, for example, constrained devices 14, or may be received as a larger payload from an application executed by a computer larger than a constrained device 14, for example, received by a remote computer in communication with the network 16. The payload can be part of a CoAP datagram, for example, the CoAP message 352 of FIG. 3, processed by a hardware processor of a constrained device. The payload can have a message size up to 1500 Bytes, or up to 9000 Bytes when jumbo frames are used. Accordingly, a CoAP message 430, or payload 352 shown in FIG. 3, implemented in a CoAPOL protocol stack 420 is different than a CoAP message implemented in a traditional CoAP protocol stack 410 due at least to the maximum message size difference, which in a conventional CoAP protocol stack 410 is limited to 1152 Bytes. Other differences between may exist between the CoAP message of a CoAP protocol stack 420 and a CoAP message of a conventional CoAP protocol stack 410. For example, the CoAP messages 252, 352 of FIGS. 2B and 3, respectively, may equally apply to the protocol stacks 410, 420, respectively, and may therefore have different features, contents, and so on.

At block 504, the CoAP payload is encapsulated in an Ethernet frame, for example, described with reference to FIG. 3.

At block 506, the Ethertype field of a frame identifies CoAPOL as the protocol encapsulated in the payload of the frame so that the data link layer of a receiving device can determine how the payload is processed. The CoAPOL payload may not require modification as compared to a conventional CoAP payload.

At block 508, the destination MAC address can be identified and provided in the Destination Address field 360.

At block 510, the CoAP payload 430 is transported directly on the data link layer as shown herein to the device identified by the in the MAC address in the Destination Address field 360. Although FIG. 4 illustrates a MACsec layer 403 between the CoAPOL payload 430 and data link layer 404, this is for illustrative purposes only, and in some embodiments may not be required to be construed as an intervening or separate layer. For example, the MACsec layer 4043 may be part of Layer 2 Ethernet security, so that the CoAPOL payload 430 is directly on the data link layer 404 and obviating the need for the network and transport (Layers 3 and 4), respectively.

As will be appreciated, at least some embodiments as disclosed include the following embodiments. In one embodiment, a system for data communication between electronic devices comprises a first electronic device, which may be a resource-constrained device; and a second electronic device that exchanges data with the first electronic device, wherein: one of the first electronic device and the second electronic device generates a message in a data unit frame complying with a protocol stack that includes a Constrained Application Protocol (CoAP) message on a data link layer in the absence of a User Datagram Protocol (UDP) layer.

Alternative embodiments of the system may include one of the following features, or any combination thereof.

The data unit frame may be an IEEE 802.3 Ethernet frame and the data link layer may be an Ethernet data link layer.

The application stored and executed by the second electronic device may translate contents of the message into a different data unit frame complying with a different protocol stack processed by a wireless communication device along a communication path.

The different protocol stack may be in compliance with Internet Engineering Task Force (IETF) Hypertext Transfer Protocol (HTTP) and IETF CoAP over User Datagram Protocol (UDP) and may include an Internet Protocol (IP).

The data unit frame may be configured to comply with a secure CoAP multicast technique.

The data unit frame may include an Ethertype field that indicates that a proprietary CoAP over Local Area Network (CoAPOL) protocol is encapsulated in the payload of the data unit frame, wherein the CoAPOL protocol may operates at Layer 2 Ethernet.

The Ethertype field indicating the proprietary CoAPOL protocol may support the 802.1AE MACsec security standard.

The system may comprise a security layer between the CoAP message and the data link layer.

The first electronic device may be configured to receive and process a message in the data unit frame including an Ethertype field that may indicate that a proprietary CoAP over Local Area Network (CoAPOL) protocol is encapsulated in the payload of the data unit frame.

The first electronic device may be configured to generate and transmit a message in the data unit frame complying with a protocol stack that includes the CoAP message directly on the data link layer; and wherein a security protocol may be at the data link layer in the absence of a network layer and an IP address.

In another embodiment, an electronic device comprises circuitry that is configured to generate and transmit a message in a data unit frame complying with a protocol stack that includes a Constrained Application Protocol (CoAP) payload directly on a data link layer; and provide a security protocol at the data link layer in the absence of a network layer.

Alternative embodiments of the electronic device may include one of the following features, or any combination thereof.

The data unit frame may be an Ethernet frame and the data link layer may be an Ethernet data link layer.

The data unit frame may be configured to comply with a secure CoAP multicast technique.

The data unit frame may include an Ethertype field that indicates that a proprietary CoAP over Local Area Network (CoAPOL) protocol is encapsulated in the payload of the data unit frame, wherein the CoAPOL protocol may operate at Layer 2 Ethernet.

The Ethertype field may indicate that the proprietary CoAPOL protocol supports MACsec security.

In another embodiment, a communication system for securely communicating data packets between a first device and a second device comprises a first network complying with a first communication protocol; a first device being configured to communicate via the first network with other devices in communication with the first network, the first device being configured to generate a message in a data unit frame complying with a protocol stack that includes a CoAP payload directly on a data link layer; a second network being based on a second communication protocol; a second device being configured to generate a message complying with the second communication protocol; and a computing device storing and executing an application that facilitates a data exchange between the first communication protocol and the second communication protocol.

Alternative embodiments of the system may include one of the following features, or any combination thereof.

The computing device may include a proxy server that stores an application that facilitates the data exchange.

The application may translate contents of the message into a different data unit frame complying with a different protocol stack processed by the second device along a communication path The different protocol stack may be in compliance with Internet Engineering Task Force (IETF) Hypertext Transfer Protocol (HTTP) and IETF CoAP over User Datagram Protocol (UDP) and may include an Internet Protocol (IP), and the protocol stack may include the CoAP message on the data link (MAC) layer in the absence of UDP.

The data unit frame may include an Ethertype field that indicates that a proprietary CoAP over Local Area Network (CoAPOL) protocol is encapsulated in the payload of the data unit frame, wherein the CoAPOL protocol operates at Layer 2 Ethernet.

In another embodiment, a computer program product comprising a non-transitory computer readable medium storing a computer program comprising instructions which, when executed by processing circuitry, causes the processing circuitry to: generate and transmit a message in a data unit frame complying with a protocol stack that includes a Constrained Application Protocol (CoAP) payload directly on a data link layer; and provide a security protocol at the data link layer in the absence of a network layer.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein regarding specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for data communication between electronic devices comprising:
   a first electronic device that is a resource-constrained device; and
   a second electronic device that exchanges data with the first electronic device, wherein:
   one of the first electronic device and the second electronic device generates a message in a data unit frame complying with a protocol stack that includes a Constrained Application Protocol message on a data link layer in the absence of a User Datagram Protocol (UDP) layer.

2. The system of claim 1, wherein the data unit frame is an IEEE 802.3 Ethernet frame and the data link layer is an Ethernet data link layer.

3. The system of claim 1, wherein the application stored and executed by the second electronic device translates contents of the message into a different data unit frame complying with a different protocol stack processed by a wireless communication device along a communication path.

4. The system of claim 3, wherein the different protocol stack is in compliance with Internet Engineering Task Force (IETF) Hypertext Transfer Protocol (HTTP) and IETF CoAP over User Datagram Protocol (UDP) and includes an Internet Protocol (IP).

5. The system of claim 1, wherein the data unit frame is configured to comply with a secure CoAP multicast technique.

6. The system of claim 1, wherein the data unit frame includes an Ethertype field that indicates that a proprietary CoAP over Local Area Network (CoAPOL) protocol is encapsulated in the payload of the data unit frame, wherein the CoAPOL protocol operates at Layer 2 Ethernet.

7. The system of claim 6, wherein the Ethertype field indicating the proprietary CoAPOL protocol supports the 802.1AE MACsec security standard.

8. The system of claim 1, further comprising a security layer between the CoAP message and the data link layer.

9. The system of claim 1, wherein the first electronic device is configured to receive and process a message in the data unit frame including an Ethertype field that indicates that a proprietary CoAP over Local Area Network (CoAPOL) protocol is encapsulated in the payload of the data unit frame.

10. The system of claim 1, wherein the first electronic device is configured to generate and transmit a message in the data unit frame complying with a protocol stack that includes the CoAP message directly on the data link layer; and wherein a security protocol is at the data link layer in the absence of a network layer and an IP address.

11. An electronic device comprising:
    circuitry configured to:
        generate and transmit a message in a data unit frame complying with a protocol stack that includes a Constrained Application Protocol (CoAP) payload directly on a data link layer; and
        provide a security protocol at the data link layer in the absence of a network layer;
        wherein the data unit frame includes an Ethertype field that indicates that a proprietary CoAP over Local Area Network (CoAPOL) protocol is encapsulated in the payload of the data unit frame, wherein the CoAPOL protocol operates at Layer 2 Ethernet.

12. The electronic device of claim 11, wherein the data unit frame is an Ethernet frame and the data link layer is an Ethernet data link layer.

13. The electronic device of claim 11, wherein the data unit frame is configured to comply with a secure CoAP multicast technique.

14. The electronic device of claim 11, wherein the Ethertype field indicating the proprietary CoAPOL protocol supports MACsec security.

15. A communication system for securely communicating data packets between a first device and a second device, the communication system comprising:
    a first network complying with a first communication protocol;
    a first device being configured to communicate via the first network with other devices in communication with the first network, the first device being configured to generate a message in a data unit frame complying with a protocol stack that includes a Constrained Application Protocol (CoAP) payload directly on a data link layer;
    a second network being based on a second communication protocol;
    a second device being configured to generate a message complying with the second communication protocol; and
    a computing device storing and executing an application that facilitates a data exchange between the first communication protocol and the second communication protocol;
    wherein the data unit frame includes an Ethertype field that indicates that a proprietary CoAP over Local Area Network (CoAPOL) protocol is encapsulated in the payload of the data unit frame, wherein the CoAPOL protocol operates at Layer 2 Ethernet.

16. The communication system of claim 15, wherein the computing device includes a proxy server that stores an application that facilitates the data exchange.

17. The communication system of claim 15 wherein the application translates contents of the message into a different data unit frame complying with a different protocol stack processed by the second device along a communication path.

18. The communication system of claim 15, wherein the different protocol stack is in compliance with Internet Engineering Task Force (IETF) Hypertext Transfer Protocol (HTTP) and IETF CoAP over User Datagram Protocol (UDP) and includes an Internet Protocol (IP), and wherein the protocol stack includes the CoAP message on the data link layer in the absence of UDP.

19. The communication system of claim 15, wherein the data unit frame includes an Ethertype field that indicates that a proprietary CoAP over Local Area Network (CoAPOL) protocol is encapsulated in the payload of the data unit frame, wherein the CoAPOL protocol operates at Layer 2 Ethernet.

* * * * *